(12) United States Patent
Hall

(10) Patent No.: US 7,586,686 B1
(45) Date of Patent: Sep. 8, 2009

(54) EYEPIECE FOR HEAD MOUNTED DISPLAY SYSTEM AND METHOD OF FABRICATION

(75) Inventor: John M. Hall, Amherst, NH (US)

(73) Assignee: OASYS Technology LLC, Manchester, NH (US)

( * ) Notice: Subject to any disclaimer, the term of this patent is extended or adjusted under 35 U.S.C. 154(b) by 7 days.

(21) Appl. No.: 11/460,126

(22) Filed: Jul. 26, 2006

Related U.S. Application Data

(60) Provisional application No. 60/745,352, filed on Apr. 21, 2006, provisional application No. 60/745,260, filed on Apr. 20, 2006, provisional application No. 60/744,839, filed on Apr. 14, 2006.

(51) Int. Cl.
*G02B 25/00* (2006.01)
*G02B 27/10* (2006.01)

(52) U.S. Cl. ............... 359/643; 359/558; 359/630

(58) Field of Classification Search ............ 359/12–14, 359/480, 482, 558–576, 643–647
See application file for complete search history.

(56) References Cited

U.S. PATENT DOCUMENTS

| | | | |
|---|---|---|---|
| 4,322,135 A * | 3/1982 | Freeman | ............ 359/643 |
| 4,463,252 A | 7/1984 | Brennan et al. | |
| 4,915,487 A | 4/1990 | Riddell, III et al. | |
| 5,446,588 A | 8/1995 | Missig et al. | |
| 5,506,728 A | 4/1996 | Edwards et al. | |
| 5,526,183 A | 6/1996 | Chen | |
| 5,539,422 A | 7/1996 | Heacock et al. | |
| 5,539,578 A | 7/1996 | Togino et al. | |
| 5,546,227 A | 8/1996 | Yasugaki et al. | |
| 5,629,807 A | 5/1997 | Hall | |
| 5,689,736 A | 11/1997 | Okuyama et al. | |
| 5,696,521 A | 12/1997 | Robinson et al. | |
| 5,701,202 A | 12/1997 | Takahashi | |
| 5,822,127 A | 10/1998 | Chen et al. | |
| 5,966,244 A | 10/1999 | Mukai et al. | |
| 5,984,477 A | 11/1999 | Weissman et al. | |
| 5,991,087 A | 11/1999 | Rallison | |
| 6,147,807 A | 11/2000 | Droessler et al. | |
| 6,747,802 B2 | 6/2004 | Bignolles et al. | |
| 6,816,132 B2 * | 11/2004 | Tanijiri et al. | ............ 345/7 |
| 6,829,112 B2 | 12/2004 | Kobayashi et al. | |
| 6,903,875 B2 | 6/2005 | Achtner | |
| 6,999,239 B1 | 2/2006 | Martins et al. | |

(Continued)

OTHER PUBLICATIONS

Manhart, P.K., et al., "'Augeye': A Compact, Solid Schmidt Optical Relay for Helmet Mounted Displays," Proceedings 1993 IEEE Virtual Reality Annual International Symposium, Seattle, WA, pp. 234-245.

(Continued)

*Primary Examiner*—Darryl J Collins
(74) *Attorney, Agent, or Firm*—Houston Eliseeva LLP

(57) ABSTRACT

A monolithic optical element for an eyepiece in a head mounted display system has a body, in which a first surface of the body receives light from a display device, the light passes through a second surface of the body to an eye of a user, and a reflective folding surface is located optically between the first surface and the second surface. The reflective folding surface folds an optical path between the first surface and the second surface. Finally, a diffractive optical element is provided on at least one of the first surface or the second surface. The use of the diffractive optical surface enables the eyepiece element to be constructed of a single optical substrate material, yet function over a broad color spectrum with superior resolution and minimal distortion over a large field of view.

21 Claims, 8 Drawing Sheets

| | | | |
|---|---|---|---|
| 6,147,807 | A | 11/2000 | Droessler et al. |
| 6,747,802 | B2 | 6/2004 | Bignolles et al. |
| 6,816,132 | B2 * | 11/2004 | Tanijiri et al. ............ 345/7 |
| 6,829,112 | B2 | 12/2004 | Kobayashi et al. |
| 6,903,875 | B2 | 6/2005 | Achtner |
| 6,999,239 | B1 | 2/2006 | Martins et al. |
| 2001/0021068 | A1 * | 9/2001 | Togino et al. ............ 359/630 |

OTHER PUBLICATIONS

Manhart, P. K., et al., "What's in Your Hip Pocket?," Tribute to Warren Smith: A Legacy in Lens Design and Optical Engineering; Robert E. Fischer; Ed.,Proc. SPIE vol. 5865, Aug. 2005, pp. 22-37.

Wimberger-Friedl, R., "Molding of Optical Components," Encyclopedia of Optical Engineering, copyright 2003 by Marcel Dekker, Inc., N.Y., NY, pp. 1368-1379.

Rolland, Jannick, et al., "The Past, Present and Future of Head Mounted Display Designs," College of Optics and Photonics: CREOL & FPCE, University of Central Florida, 2004.

Riedl, Max, on Point, Tutorial, "Advances in single-point diamond turning provide improved performance for visible as well as IR optics," SPIE's oemagazine, Jul. 2004, pp. 26-29.

* cited by examiner

Grid distortion

Grid distortion

EYEPIECE FOR HEAD MOUNTED DISPLAY SYSTEM AND METHOD OF FABRICATION

RELATED APPLICATIONS

This application claims the benefit under 35 USC 119(e) of U.S. Provisional Application Nos. 60/745,352, filed on Apr. 21, 2006, 60/745,260, filed on Apr. 20, 2006 and 60/744,839, filed on Apr. 14, 2006, all three of which are incorporated herein by reference in their entirety.

BACKGROUND OF THE INVENTION

There are a variety of applications for head-mounted display systems. These systems typically include image displays such as micro-flat-panel display devices based on organic light emitting diode (OLED) technology or active-matrix liquid crystal display (AMLCD) technology, for example. The systems also include eyepieces that couple the light from the display devices and possibly light from the environment to the users' eyes.

The head-mounted display systems are applied to the military, in field operations and simulations, medical procedures, and industrial maintenance operations. There are now also opportunities to use head-mounted displays for game consoles, cellular phones, portable video players, and other entertainment and communication devices.

In these head-mounted display systems, simple, efficient eyepiece designs are desired both to decrease cost and improve reliability and mechanical robustness. The head-mounted displays, however, pose two challenges that have made simple eyepieces unsuitable. The first challenge is the need for a large field of view and long eye relief, i.e., distance between the eye and the first optical element. These two opposing requirements place a geometric limitation on the eyepiece design. The second challenge is operation over the full color, red-green-blue visible spectrum. It is well known in the art that it is not possible to provide color aberration correction with only one powered refractive lens material. The result is that most conventional head-mounted display eyepieces have multiple optical elements that must be individually fabricated, aligned, and assembled. This adds significant cost and complexity to the end-product.

One attempt to overcome the chromatic problem is to create an eyepiece that relies upon reflective power, which inherently has no chromatic aberration. The "Solid-Schmidt" design is well known in the prior art, using a powered mirror surface in conjunction with a double-pass beamsplitter surface. See, e.g., U.S. Pat. No. 5,696,521 to Robinson, et. al. However, the Solid-Schmidt's reliance upon reflective optical power makes it less able to image a wide field of view without adding an exterior corrector lens.

Nonetheless, there are eyepiece solutions in the market that achieve good optical imaging performance in a monolithic, single-element package. An example was disclosed in U.S. Pat. No. 5,701,202 by Takahashi. It includes a monolithic element generally made of molded plastic, and makes use of aspheric curvatures for the refractive entrance and exit ports, as well as an asphere on the reflective surface inside the element. The powered reflector has the advantage of minimal color aberration, and thus this eyepiece is well suited for use with color micro-flat-panel display devices on the order of 0.7"-1.0" diagonals. The coatings on the exit surface nearest to the eye pupil are designed to operate in transmissive mode over a range of angles near normal to the surface, and in a reflective mode for steeper angles coming from the display device. The primary disadvantage with this design form is that it does not provide a simple means for adding either a "see-through" optical path with no optical power, or for adding a second image plane for the purpose of optically combining two image sources located at finite conjugate distances.

SUMMARY OF THE INVENTION

In general according to one aspect, the invention features an optical element for an eyepiece. The element comprises a body, in which a first surface of the body receives light from a display device, the light passes through a second surface of the body to an eye of a user, and a reflective folding surface is located optically between the first surface and the second surface. The reflective folding surface folds an optical path between the first surface and the second surface. Finally, a diffractive optical element is provided on at least one of the first surface or the second surface.

The use of the diffractive optical surface enables the eyepiece to have only a single optical substrate material, yet function over a broad color spectrum with limited distortion.

In embodiments, at least one of the first surface, the second surface, and the reflective folding surface is curved. Also, the reflective folding surface is within the body in some examples. In some implementations, the body comprises two pieces with the reflective folding surface being at an interface between the two pieces of the body.

Some embodiments further include a reflecting surface for receiving the light from the display device through the first surface and directing the light to the reflective folding surface.

In a preferred embodiment, the diffractive optical element is formed on the first surface located as far away from the user's eye as possible. This configuration minimizes stray light and artifacts created by unwanted diffractive orders. Also, the first surface is preferably curved to form a hybrid refractive and diffractive optical element.

In some embodiments, the eyepiece also provides light from the environment to the user's eye. Specifically, a third surface of the body is provided, through which light from an environment is received. The light from the environment passes through the second surface to the eye of the user, possibly also through the reflective folding surface on the path to the second surface and to the eye of the user.

In one embodiment, the second surface and the third surface are planar surfaces.

In one application, the light from the environment is provided from an image intensifier tube.

In general according to another aspect, the invention features a head-mounted display system. This system comprises a display device for generating an image and an eyepiece for coupling the image from the display device to an eye of a user. The eyepiece has a single body for coupling the image of the display device to the eye, the body having a first surface for directly receiving light from the display device without the need for an exterior corrector element as common in the art, a second surface through which the light from the display device passes to the eye of the user once again without the need for any exterior optical correction elements. A diffractive optical element is provided on at least one of the first surface or the second surface.

In general according to another aspect, the invention features a fabrication process for an eyepiece including a body, a first surface, a second surface, and a reflective folding surface, in which a diffractive optical element is formed on at least one of the first surface or the second surface. The process comprises fabricating one or more molds having inverses of the first surface, second surface, and reflective folding surface, forming an inverse of the diffractive optical element on an inner surface of the mold, using diamond turning for example, filling the one or more molds with material, and ejecting the material after at least some solidification to yield the eyepiece.

In general according to still another aspect, the invention features a fabrication process for an eyepiece. The process comprises fabricating one or more molds having inverses of the first surface, second surface, and reflective folding surface, filling the one or more molds with material, ejecting the material after at least some solidification to form the body, and forming the diffractive optical element on the body, such as by embossing, to yield the eyepiece.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
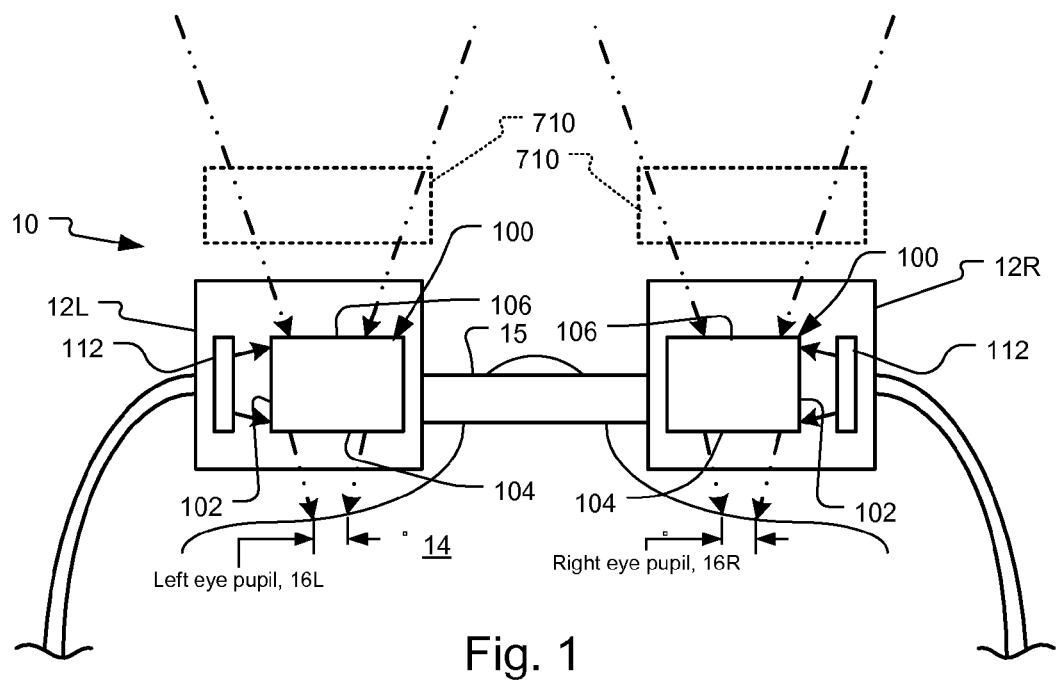
FIG. 1 is top schematic view showing a head-mounted display system according to the invention being worn by a user.

FIG. 1 shows a head-mounted display system 10, which has been constructed according to the principles of the present invention.

In one example, the head-mounted display system 10 has right and left eye or ocular systems 12R, 12L. These are supported on the user 14 by a frame 15, in front of the right and left eye pupils 16R, 16L of the user 14 to yield a binocular system.

Each eyepiece system 12R, 12L comprises, in one example, separate display devices 112. Light from the display devices 112 is coupled into the respective eyepieces 100 via display entrance ports 102 and then to the user's pupils 16R, 16L via exit ports 104.

In some embodiments, the eyepieces 100 also couple light from an environment to the user's pupils 16R, 16L via environment entrance ports 106 and the respective exit ports 104. A typical "see-through" application requires that there be no optical power in the environmental light path in order to afford normal vision. However, this environmental light may also be preprocessed using image intensifier devices 710 in some implementations. In these cases, the environmental optical path provides optical power equivalent or better than that of a typical intensifier eyepiece.

Figure 2:
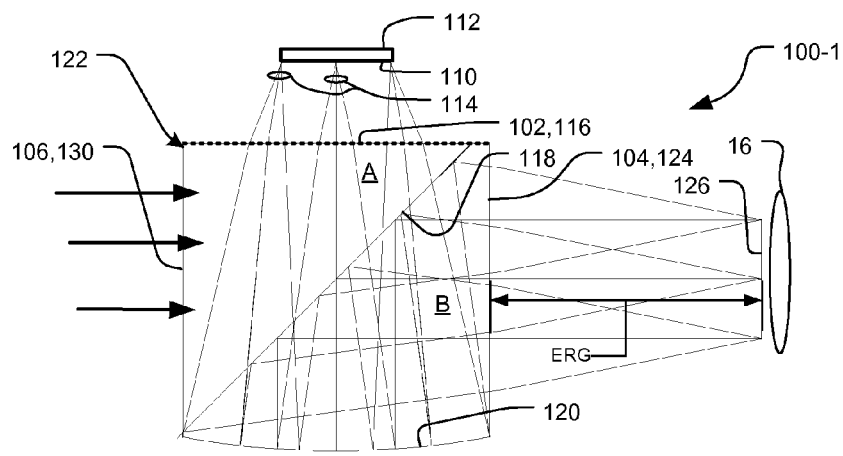
FIG. 2 is a top plan view of an optical element for an eyepiece of the inventive head-mounted display system, according to a first embodiment.

FIG. 2 shows a Solid-Schmidt eyepiece 100-1 that has been constructed according to the principles of the present invention for use in a head-mounted display system, for example.

Specifically, this Solid-Schmidt see-though eyepiece 100-1 improves upon the prior art by applying a diffractive optical surface integral to the Solid-Schmidt element. The diffractive surface replaces the field lens or any other exterior optical elements or surfaces, thereby resulting in a more compact and monolithic structure. That is, in the preferred embodiment, light from the display device 112 passes to a body 122 of the eyepiece 100-1 without passing through any other optically powered surface and from the body 122 of eyepiece 100-1 to the user's pupil 16 without any other intervening optically powered surface. Additionally, the diffractive surface extends the performance range of the eyepiece to include wider fields of view and longer eye-relief distances.

In more detail, a single ocular channel is illustrated, which would be duplicated for and combined with a second channel to make a binocular display as illustrated in FIG. 1.

The image source is shown as a planar surface or image plane 110. In the current implementation, a display device 112 such as an LCD or OLED based system is located at this image plane 110. Other examples of display devices include cathode ray tubes (CRT's), electroluminescent (EL) panels, digital micro-mirrors (DMD's), or Liquid Crystal on Silicon (LCOS) panels, to list a few alternative display technologies.

The point source light bundles 114 emerge from the image plane 110 and pass into the eyepiece display entrance port 102 through a diffractive surface 116. The light is diffracted and then refracted by the material of the solid eyepiece, and travels through a partial beamsplitter surface 118, and continues to a reflective mirror surface 120.

There are a number of options for implementing the beamsplitter surface 118. In one example, the body 122 of the eyepiece 100-1 is formed by bonding two pieces A, B that are joined along an interface forming the beamsplitter surface 118 with an optical cement. One or both of the faces of the pieces A, B forming the interface are coated with a partially, 50% e.g., reflective or polarizing coating, for example. In another example, the pieces A, B of the body are made from different materials to create a refractive index mismatch as the interface to provide partial reflectivity. The solid eyepiece body 122 is made of an optically transmissive material, preferably optical glass such as BK7, or plastics such as acrylic.

The mirror 120 provides the bulk of the dioptric power, effectively collimating the image of the source 112. The mirror 120 is preferably coated with a thin film coating or a metal coating, such as silver, to provide the requisite reflectivity.

The near collimated light impinges upon the backside of surface 118, but this time reflects through the eyepiece material towards the exit port 104 and output surface 124 of the eyepiece 100-1. Preferably the output surface 124 is an optically flat surface with no dioptric power. It is also preferably antireflection (AR) coated.

The collimated light leaves the eyepiece 100-1 and crosses the eye relief air gap ERG, whereupon it is received into the pupil 16 of the user's eye and thus is ultimately focused onto the retina of the eye 126.

Simultaneously, light from the surrounding environment, "real world," passes into the body through environment entrance ports 106 straight through the outer optically neutral surface 130. Preferably, this surface is antireflection coated. The environmental light passes through the beamsplitter surface 118 and exit surface 124, and then to the user's eye pupil 16. The neutral "see-through" path thus incurs no optical power, allowing a natural view of the outer world.

It is usually preferred to have the eyepiece 100-1 provide a collimated output for "infinity focus" of the wearer's eye. However, if some other dioptric focus setting is required, it is accomplished by varying the air gap distance between the display source 112 and the display entrance port 102 diffractive entrance surface 116 of the eyepiece.

The diffractive surface 116 is preferably designed by established techniques to those skilled in the art of optical design, preferably through the use of a commercially available optical software design package such as Zemax, Code V, OSLO, Optalix, KDP2, or equivalent.

The diffractive surface 116 is preferably fabricated with well known and understood practices such as diamond turning, ion or chemical etching, or replication via mold processes depending upon the substrate material chosen. The diffractive surfaces are the key to accomplishing the optical performance in a single element. The optical phase $\phi$ of a diffractive surface at radius r can be expressed by the following equation:

$$\Phi(r) = A_i \left(\frac{r}{R_N}\right)^{2i}$$

where i is the polynomial term number, $A_i$ is the coefficient in radians, and $R_N$ is the normalization radius. The diffractive sag profile is modulo $2\pi$, which means that the physical surface sag of the optical surface collapses to a repeating cycle of depth cuts which are defined by the desired diffractive order equation:

$$d = \frac{m\lambda}{n-1}$$

where d is the physical depth of the surface sag, m is the desired diffractive order, and n is the substrate material index of refraction. The phase profile can provide either positive (converging) or negative (diverging) optical power as desired (FIG. 2). For the broadest spectral efficiency, the order m=1 is usually the best. In general, the value of the spectral diffraction efficiency $\eta$ for an arbitrary order m is given by a sinc-function equation:

$$\eta = \left[\frac{\sin\left(\pi\left[\frac{n-1}{\lambda}d - m\right]\right)}{\pi\left[\frac{n-1}{\lambda}d - m\right]}\right]^2$$

The main issue concerning the design of the diffractive profile is to constrain the phase such that the spacing between consecutive modulo $2\pi$ phase transitions (i.e., the diffractive "rings") remains wide enough for the desired manufacturing process to create the surface. With modern computer models it is quite possible to design a single surface diffractive element that contains all the optical power necessary for the eyepiece such that no base aspheric curvature is required, but such an element will be wholly un-manufacturable because the phase transitions will be excessively dense with spacings much less than what is possible to achieve with either chemical or ion etching, diamond turning, lithography, or any other fabrication process.

The combination of a diffractive surface profile on top of an aspheric refractive surface provides a powerful method for simultaneous correction of both chromatic and geometric aberrations such as spherical, coma, and astigmatism. The asphere provides most of the geometric optical power, leaving the diffractive to handle most of the chromatic aberrations. The typical surface sag s formula for a rotationally symmetric asphere is given by:

$$s = \frac{cr^2}{1 + \sqrt{1-(1+k)c^2r^2}} + Ar^4 + Br^6 + Cr^8 + Dr^{10}$$

where r is the radial height above the optic axis, c is the base curvature (i.e., the inverse of the radius of curvature), k is the conic constant, and A, B, C, and D are higher order polynomial coefficients. The combination of aspheric refractive and diffractive optical power results in an element that is readily manufacturable.

Design Parameters for the diffractive surface 116 of FIG. 2 (Monolithic See-Through Cube Eyepiece):

| Parameter | Symbol | Value |
|---|---|---|
| Norm Radius (mm) | $R_N$ | 11.40 |
| DOE Coefficient for $r^2$ | $A_2$ | −1500 |
| Wavelength (microns) | $\lambda$ | 0.55 |
| Index of Refraction | n | 1.491 |
| Diffraction Order | m | 1 |
| Asphere Coefficients: | c | −0.01895247 |
| | k | 0 |
| | A | −3.5318E−05 |
| | B | 5.0641E−07 |
| | C | −4.2249E−09 |
| | D | 1.250E−11 |

The other non-powered optical surfaces 118, 124, 130 are be made with conventional fly-cutting, polishing or molding or more advanced techniques such as diamond turning as desired. It is also worth noting that all the optical surfaces are either parallel or orthogonal, and no off-axis tilting or decentering is necessary to achieve excellent optical quality. Likewise, the powered optical surfaces of the mirror 120 and the diffractive surface 116 are rotationally symmetric about the optical axis.

The preferred embodiment shown in FIG. 2 possesses the following first order characteristics, which are believed to be competitive with other high performance eyepieces:

| Focal Length: | 23.85 mm |
|---|---|
| Color Spectrum: | Photopic (0.486-0.656 micrometer wavelengths) |
| Eye Relief: | >22 mm |
| Field of View: | >30 degrees horizontal |

Figure 3:
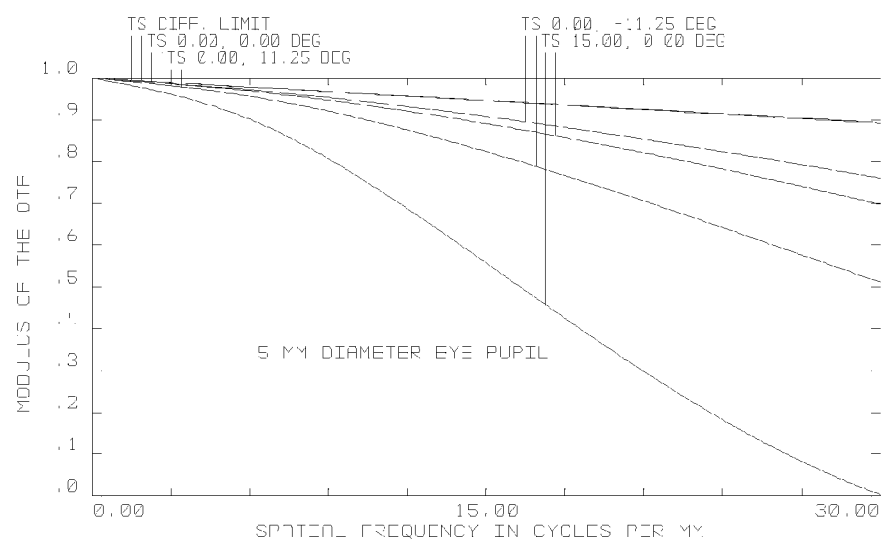
FIG. 3 is a plot of the modulus of the optical transfer function as a function of spatial frequency in cycles per millimeter (mm) showing the Modulation Transfer Function (MTF) curve for the first embodiment eyepiece.

The performance of the preferred embodiment is further characterized by FIG. 3, which shows a Modulation Transfer Function (MTF) curve for an implementation of the embodiment of FIG. 2. The curve is generated assuming the eye pupil passes a 5 millimeter (mm) diameter ray bundle, and shows that on-axis the image quality is nearly diffraction limited, with no appreciable drop in resolution until the edge of the field is reached.

The foregoing design provides advantages over many previous Solid-Schmidt eyepieces, which often include at least one field lens inserted in the air gap between the Solid-Schmidt and the location of the display image source. This lens is usually needed for correction of residual aberrations not compensated by the reflective surface, which may include a lateral color, astigmatism, field curvature, or distortion. The field lens becomes particularly important to obtain a high quality image when the field of view of the system increases beyond about 10 degrees.

Figure 4:
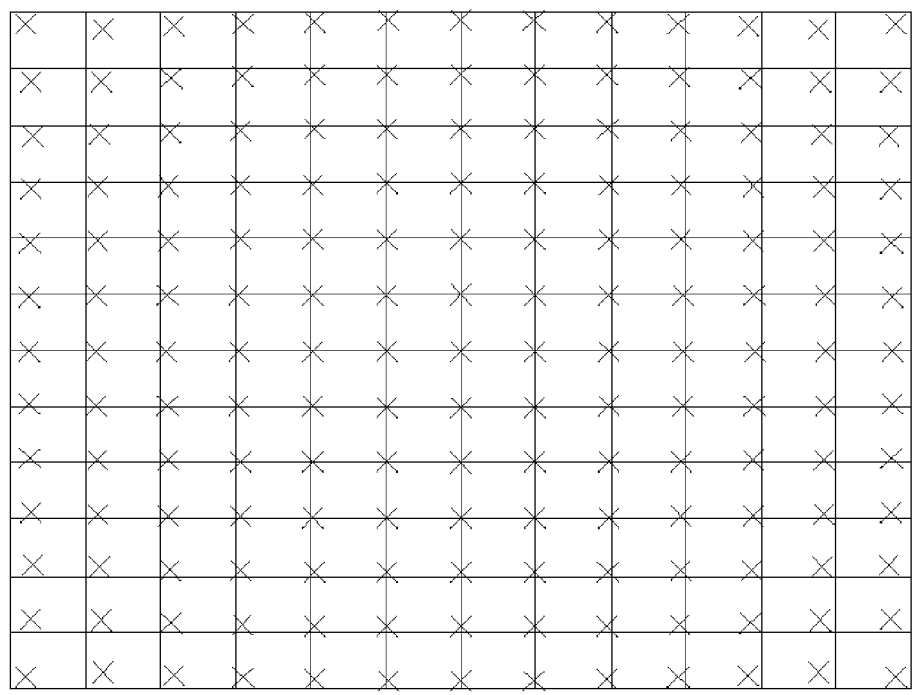
FIG. 4 is a distortion map of the first embodiment eyepiece.

FIG. 4 shows a distortion map of the eyepiece with <5% magnitude. The low distortion results in comfortable viewing even if the user's eye pupil is not perfectly centered along the designed optical axis.

Figure 5:
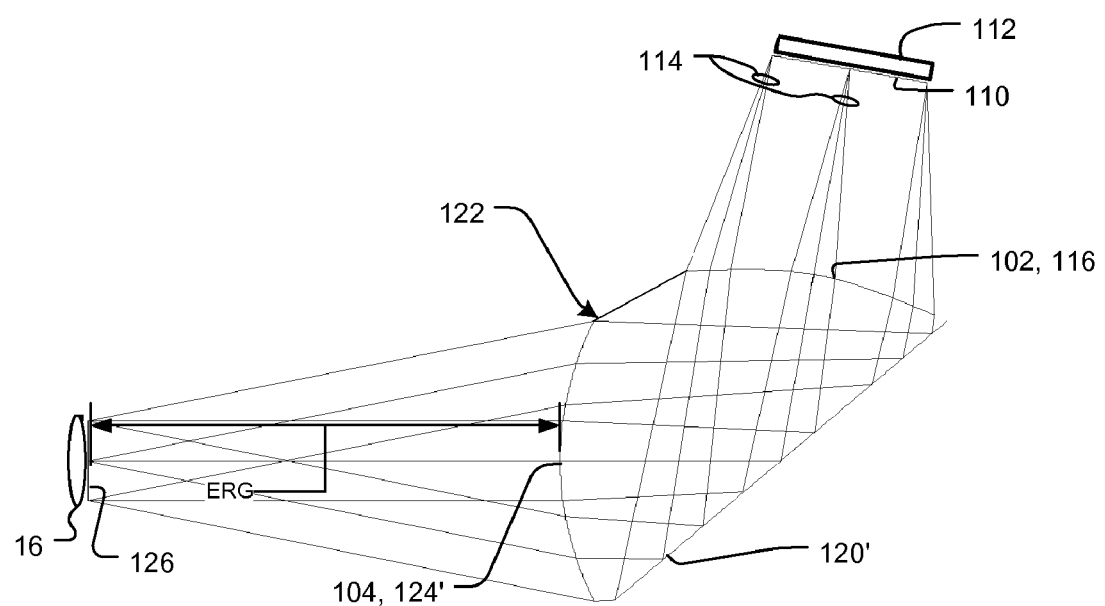
FIG. 5 is a top plan view of an optical element for an eyepiece of the inventive head-mounted display system, according to a second embodiment.

FIG. 5 shows a second embodiment of an eyepiece 100-2 that has been constructed according to the principles of the present invention.

This second embodiment eyepiece 100-2 can also be made monolithic. It preferably incorporates an aspheric and a diffractive optical element (DOE) surface that together can yield excellent eyepiece performance over a large field of view and relatively long eye relief distance. This element needs only two powered surfaces, as opposed to the three of the prior art, and achieves full color correction via the DOE surface. The reflective surface simply provides mechanical folding and is not optically significant otherwise, in a current preferred embodiment. The element does not require any optical anti-reflection coatings, though they may be added to improve stray light rejection. If the element is made of a plastic material, it can be readily manufactured either directly by diamond turning or by a mold process wherein a metal mold master is diamond turned.

In more detail, light 114 originates at image plane surface 110, which is the location of the flat panel display source surface 112. It then passes into the body 122 of the monolithic element 100-2 through the diffractive surface 116 at the display entrance port 102. The body 122 is preferably fabricated on a solid, optically transmissive, dielectric material such as acrylic or glass.

The diffractive surface 116 is similarly manufactured with well known practices such as diamond turning, ion or chemical etching, or even replication via mold processes depending upon the substrate material chosen.

Light continues inside the dielectric material and undergoes a reflection off of surface 120', which is preferably a simple folding flat with no optical power.

The mirror surface 120' is preferably fabricated by common methods, including a simple metallized layer or dielectric stack coatings. The flat surface 120' is preferably positioned at about a 45 degree angle, or as shown, may be at a 50 degree angle if that better suits overall packaging of the display components.

Light then proceeds through the exit port 104, output surface 124', which has an aspheric curvature. Surface 124' is covered with an anti-reflection coating to reduce stray light effects in some implementations. Light then proceeds across an air eye relief gap ERG to the image plane 126 and the pupil 16 of the wearer's eye.

The eyepiece is generally preferred to provide a collimated output for "infinity focus" of the wearer's eye. However, if some other dioptric focus setting is required, it is accomplished by varying the air gap distance between the display source 112 and the diffractive surface 116 of the eyepiece body 122.

The preferred embodiment shown possesses the following first order characteristics, which are believed to be competitive with other high performance eyepieces:

| Focal Length: | 23.85 mm |
|---|---|
| Color Spectrum: | Photopic (0.486-0.656 micrometer wavelengths) |
| Eye Relief: | >30 mm |
| Field of View: | >30 degrees horizontal |

The following table sets forth the design Parameters for the diffractive surface 116 in the Monolithic Occluded Cube Eyepiece of the second embodiment:

| Parameter | Symbol | Value |
|---|---|---|
| Norm Radius (mm) | $R_N$ | 8.0 |
| DOE Coefficient for $r^2$ | $A_2$ | −1500 |
| Wavelength (microns) | λ | 0.55 |
| Index of Refraction | n | 1.491 |
| Diffraction Order | m | 1 |
| Asphere Coefficients: | c | 0.05179 |
| | k | 0.0 |
| | A | −1.9325E−04 |
| | B | 1.49438E−06 |
| | C | −9.840E−09 |
| | D | 2.5014E−11 |

Figure 6:
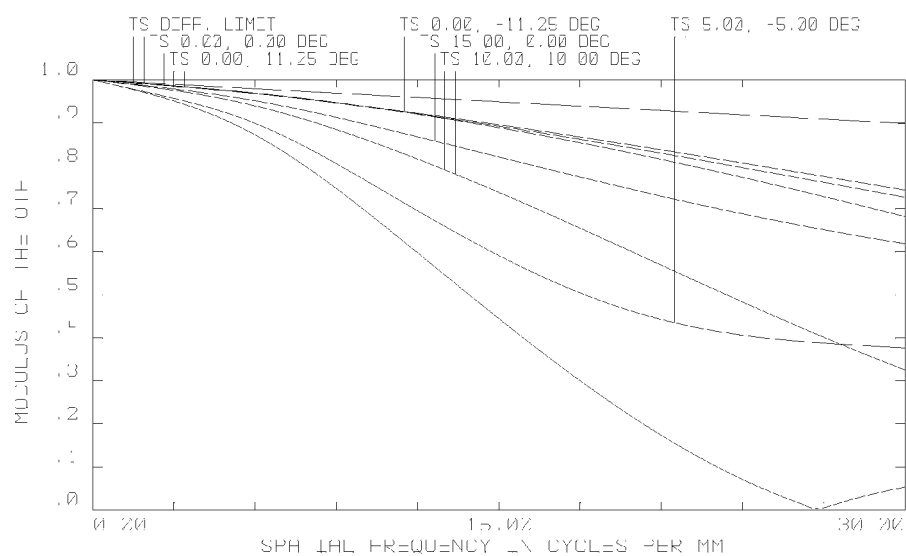
FIG. 6 is a plot of the modulus of the optical transfer function as a function of spatial frequency in cycles per millimeter (mm) showing the Modulation Transfer Function (MTF) curve for the second embodiment eyepiece.

FIG. 6 shows a Modulation Transfer Function (MTF) curve for an implementation of the second embodiment eyepiece 100-2. The curve is generated assuming the eye pupil passes a 5 mm diameter ray bundle, and shows that on-axis the image quality is nearly diffraction limited, with no appreciable drop in resolution until the edge of the field is reached.

Figure 7:
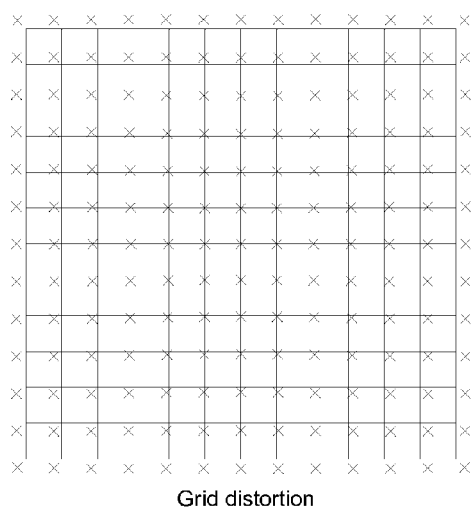
FIG. 7 is a distortion map of the second embodiment eyepiece.

FIG. 7 shows a distortion map of the eyepiece with <5% magnitude. The low distortion results in comfortable viewing even if the user's eye pupil is not perfectly centered along the designed optical axis.

Figure 8:
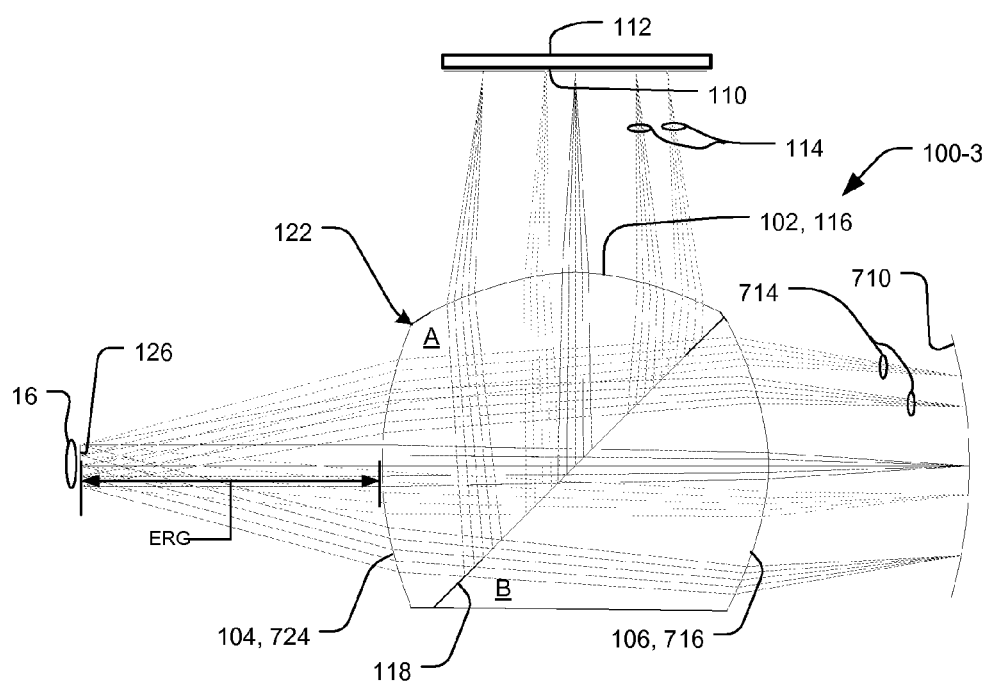
FIG. 8 is a top plan view of an optical element for an eyepiece of the inventive head-mounted display system, according to a third embodiment.

FIG. 8 shows a third embodiment of an eyepiece 100-3 that has been constructed according to the principles of the present invention.

This third embodiment provides full color correction and simultaneous imaging of two separate focal planes by means of a single, monolithic element.

In more detail, light 114 originates either at surface 110, which is the location of the flat panel display source surface 112, or light 714 at surface 710.

In one example, surface 710 represents the light output from the phosphor output of an image intensifier tube. Specifically, surface 710 shows the typical 40 mm radius of curvature over the 18 mm format diameter of an intensifier tube output.

Light then passes into the monolithic element body 122 through either the upper asphere/diffractive surface 116 functioning as the display entrance port 102 or straight-through asphere/diffractive surface 716 functioning as environment entrance port 106. Both surfaces are fabricated onto a solid, optically transmissive, dielectric material such as acrylic or glass.

Light from the display 112 is reflected by beamsplitter surface 118 to leave the body 122 through exit port 104, curved, (aspheric or spherical) output surface 724. Light from surface 710 passes through beamsplitter surface 118 to exit port 104 and the user pupil 116.

The eyepiece is generally preferred to provide a collimated output for "infinity focus" of the wearer's eye. However, if some other dioptric focus setting is required, it is easily accomplished by simply varying the air gap distance between the display sources 110, 710 and the diffractive surfaces 116, 716 of the eyepiece 100-3.

The preferred embodiment possesses the following first order characteristics, which are believed to be competitive with other high performance eyepieces found in night vision goggles and other head-mounted displays:

| | |
|---|---|
| Focal Length: | 26.4 mm |
| Color Spectrum: | Photopic (0.486-0.656 micrometers wavelengths) |
| Eye Relief: | 25 mm |
| Field of View: | 40 degrees circular |

However, it is noted that the basic design form can be linearly scaled to provide a better match for a variety of display panel formats ranging from 8 mm to over 35 mm.

Figure 9:
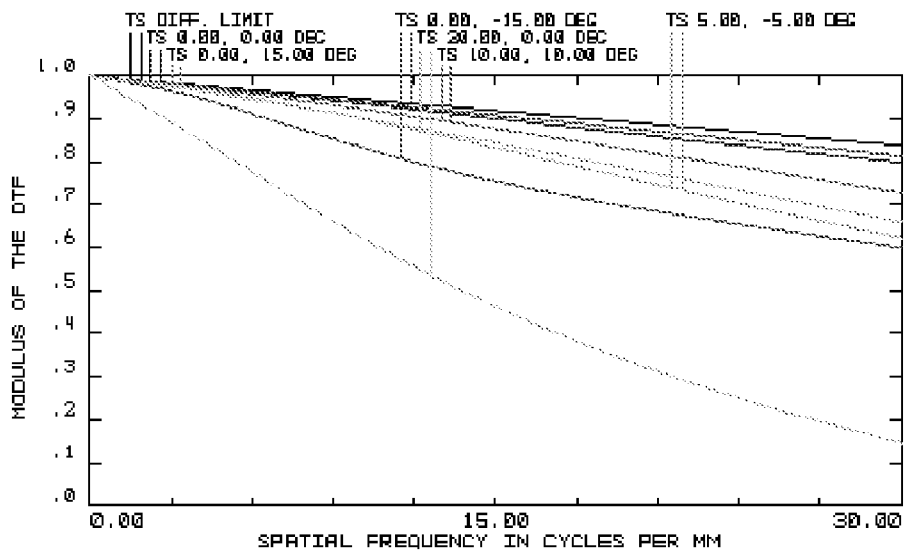
FIG. 9 is a plot of the modulus of the optical transfer function as a function of spatial frequency in cycles per millimeter (mm) showing the Modulation Transfer Function (MTF) curve for the intensifier path of the third embodiment eyepiece.
Figure 10:
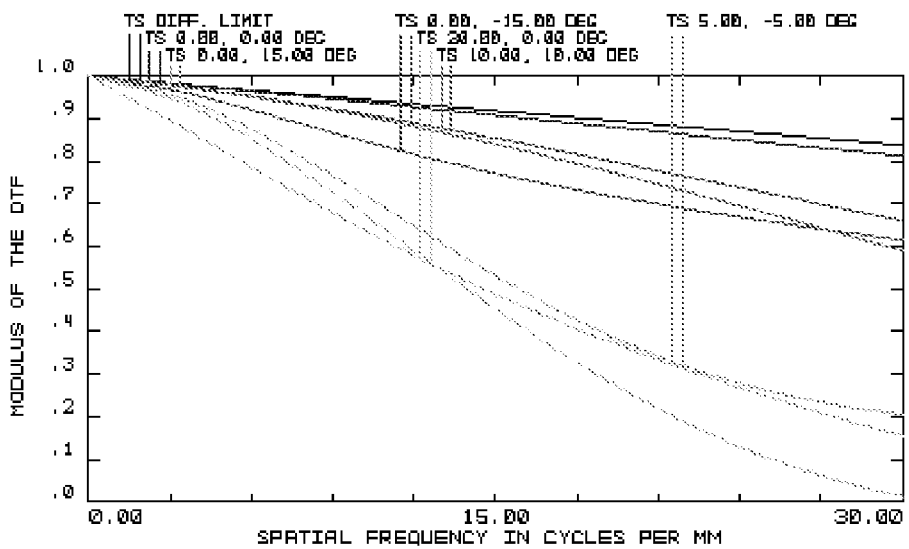
FIG. 10 is a plot of the modulus of the optical transfer function as a function of spatial frequency in cycles per millimeter (mm) showing the Modulation Transfer Function (MTF) curve for the display device path of the third embodiment eyepiece.

FIGS. 9 and 10 show the Modulation Transfer Function (MTF) curves for the intensifier and display paths, respectively. The curves are generated assuming the pupil passes a 5 mm diameter ray bundle, and show that on-axis the image quality is nearly diffraction limited, with no appreciable drop in resolution until the edge of the field is reached.

The following table set forth the Design Parameters for the diffractive surface in the Monolithic Dual-Image Eyepiece of the third embodiment:

| Parameter | Symbol | Value |
|---|---|---|
| Norm Radius (mm) | $R_N$ | 11.0592 |
| DOE Coefficient for $r^2$ | $A_2$ | −1935.36 |
| Wavelength (microns) | $\lambda$ | 0.55 |
| Index of Refraction | n | 1.491 |
| Diffraction Order | m | 1 |
| Asphere Coefficients: | c | 6.08E−02 |
| | k | 0.0 |
| | A | −1.77E−04 |
| | B | 1.20E−06 |
| | C | −5.27E−09 |
| | D | 6.78E−12 |

Creating an eyepiece which images both an intensifier tube and a flat panel display is a challenging task for which simple eyepieces are wholly unsuitable. The illustrated embodiment can provide a large field of view (>40 degrees) and long eye relief (>25 mm), which are typical for all intensifier goggles. It also corrects for chromatic correction over the flat panel's full color red-green-blue visible spectrum, which is much broader than the typical P43 green phosphor from the intensifier.

Figure 11:
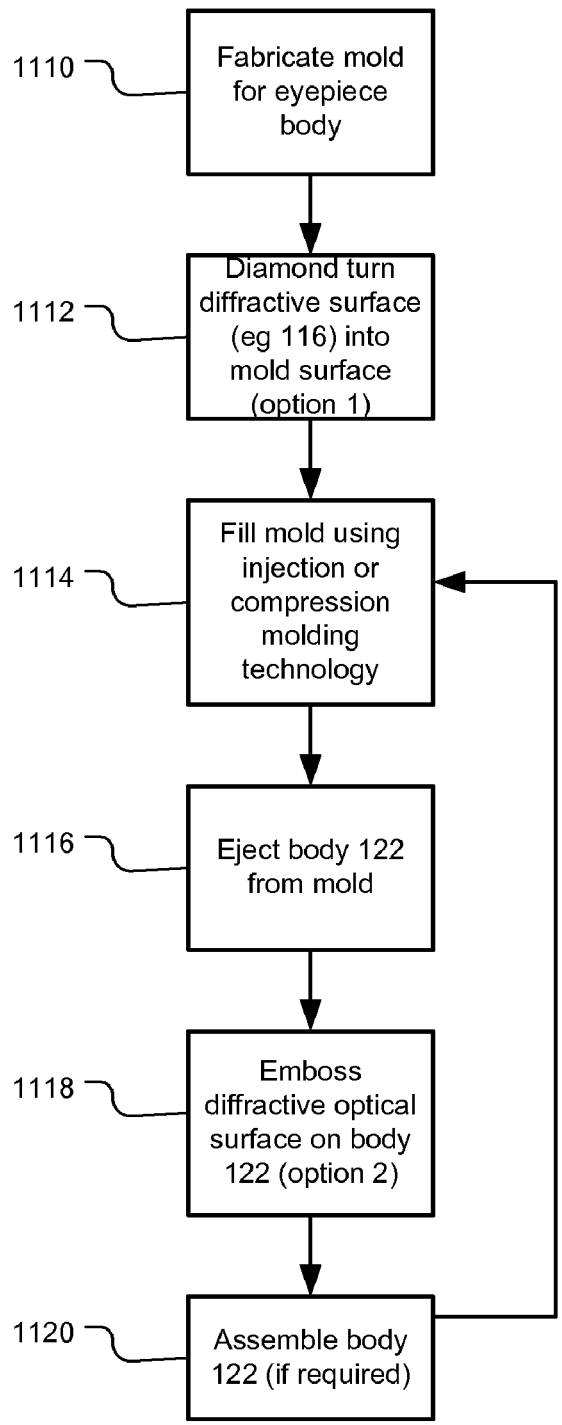
FIG. 11 is a flow diagram showing a process for fabricating eyepieces according to the present invention.

FIG. 11 shows one option for manufacturing the eyepiece 100 and specifically body 122, potentially at low cost.

In this molding process, the mold or molds are first fabricated in step 1110. The mold preferably has the inverse of the surfaces associated with the environment input port 106, display input port 102, and the output port 104 formed in its internal walls. In the specific example of the first embodiment, two molds are required that have the inverse of any refractive curvature of surface 116, mirror surface 120, beamsplitter surfaces 118, and output surface 124. In contract, the second embodiment might require only single mold.

In step 1112, the inverses of one or more diffractive surfaces, for example surface 116 of the first embodiment, are formed in the mold according to a first fabrication option. Presently, this might be accomplished with diamond turning or other microfabrication techniques such as lithography with or without chemical or ion etching.

In step 1114, the mold is filled with the plastic or other material for the body 122 in a compression or injection molding process, for example.

In step 1116, the body 122 is ejected after sufficient material solidification.

In step 1118, if a second fabrication option is pursued as an alternative to the first option, the diffractive optical element, such as element 116 in the first embodiment, is added to the body. In one example, an embossing process is used, in which the diffractive element 116 is impressed into the body by local deformation (e.g., heated stamping UV curing to facilitate deformation) or in a thin layer of material applied to the body. Other options are lithography or fabricating the element 116 separately and then bonding it to the body 122.

Finally, in step 1120, the body 122 is assembled if it has two pieces such as the first and third embodiments.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical element for an eyepiece, comprising:
   a single optical body;
   a first surface of the single optical body for receiving light from a display device;
   a second surface of the single optical body through which the light from the display device passes to an eye of a user;
   a reflective folding surface within the single optical body, optically between the first surface and the second surface, for folding an optical path between the first surface and the second surface;
   a third surface of the single optical body through which light from an environment is received, with the light from the environment passing through the reflective folding surface and the second surface to the eye of the user; and
   a diffractive optical element on the first surface of the single optical body.

2. An optical element as claimed in claim 1, wherein at least one of the first surface, the second surface and the reflective folding surface is curved.

3. An optical element as claimed in claim 1, further comprising a second reflecting surface on the single optical body for receiving the light from the display device via the first surface and through the reflective folding surface, and directing the light back into the reflective folding surface.

4. An optical element as claimed in claim 3, wherein the second reflecting surface is curved to provide optical power.

5. An optical element as claimed in claim 1, wherein the single optical body comprises two pieces with the reflective folding surface being within the body.

6. An optical element as claimed in claim 1, wherein the single optical body comprises two pieces, which are bonded together, with the reflective folding surface being at an interface between the two pieces of the single optical body.

7. An optical element as claimed in claim 1, wherein the first surface is curved to form a hybrid refractive and diffractive optical element.

8. An optical element as claimed in claim 1, wherein the first surface and the second surface have aspheric refractive curvatures.

9. An optical element as claimed in claim 1, wherein the second surface and the third surface are planar surfaces.

10. An optical element as claimed in claim 1, wherein the second surface and the third surface each have substantially no refractive power.

11. An optical element as claimed in claim 1, wherein the second surface and the third surface have aspheric curvatures.

12. An optical element as claimed in claim 1, wherein the light from the environment is provided by an image intensifier device.

13. An optical element as claimed in claim 1, wherein the diffractive optical element eliminates a need for a separate and exterior corrector field lens.

14. An optical element as claimed in claim 1, wherein the display device is a flat panel display.

15. An optical element for an eyepiece, comprising:
a single optical body;
a first surface of the single optical body for receiving light from a display device;
a second surface of the single optical body through which the light from the display device passes to an eye of a user;
a reflective folding surface, within the single optical body and optically between the first surface and the second surface, for folding an optical path between the first surface and the second surface;
a third surface of the single optical body through which light from an environment is received, with the light from the environment passing through the reflective folding surface and the second surface to the eye of the user; and
a diffractive optical element on the first surface of the single optical body; and
a second reflecting surface on the single optical body for receiving the light from the display device via the first surface and through the reflective folding surface, and directing the light back into the reflective folding surface;
wherein the second surface and the third surface together have substantially no refractive power.

16. An optical element as claimed in claim 15, wherein the second reflecting surface is curved to provide optical power.

17. An optical element as claimed in claim 15, wherein the single optical body comprises two pieces with the reflective folding surface being within the single optical body.

18. An optical element as claimed in claim 15, wherein the single optical body comprises two pieces which are bonded together with the reflective folding surface being at an interface between the two pieces of the single optical body.

19. An optical element as claimed in claim 15, wherein the first surface is curved to form a hybrid refractive and diffractive optical element.

20. An optical element as claimed in claim 15, wherein the diffractive optical element eliminates a need for a separate and exterior corrector field lens.

21. An optical element as claimed in claim 15, wherein the display device is a flat panel display.

* * * * *